United States Patent
Fordell

(10) Patent No.: US 10,911,145 B2
(45) Date of Patent: Feb. 2, 2021

(54) LONG-DISTANCE RF FREQUENCY AND TIME TRANSFER

(71) Applicant: Teknologian tutkimuskeskus VTT Oy, Espoo (FI)

(72) Inventor: Thomas Fordell, Vtt (FI)

(73) Assignee: TEKNOLOGIAN TUTKIMUSKESKUS VTT OY, Espoo (FI)

(*) Notice: Subject to any disclaimer, the term of this patent is extended or adjusted under 35 U.S.C. 154(b) by 0 days.

(21) Appl. No.: 16/648,418

(22) PCT Filed: Sep. 20, 2018

(86) PCT No.: PCT/FI2018/050679
§ 371 (c)(1),
(2) Date: Mar. 18, 2020

(87) PCT Pub. No.: WO2019/058028
PCT Pub. Date: Mar. 28, 2019

(65) Prior Publication Data
US 2020/0266895 A1   Aug. 20, 2020

(30) Foreign Application Priority Data
Sep. 21, 2017 (FI) .................................. 20175838

(51) Int. Cl.
*H04B 10/077* (2013.01)
*H04B 10/2575* (2013.01)
(Continued)

(52) U.S. Cl.
CPC ........... *H04B 10/2575* (2013.01); *G06F 1/14* (2013.01); *H04B 10/0775* (2013.01);
(Continued)

(58) Field of Classification Search
None
See application file for complete search history.

(56) References Cited

U.S. PATENT DOCUMENTS

| | | | | |
|---|---|---|---|---|
| 5,031,234 A | * | 7/1991 | Primas | H04B 10/2587 250/201.9 |
| 5,210,587 A | * | 5/1993 | Ohmamyuda | G01S 17/36 356/5.15 |
| 2015/0248047 A1 | * | 9/2015 | Chakraborty | G02F 1/3544 359/278 |

OTHER PUBLICATIONS

Akiyama et al., "Phase stabilized RF reference signal dissemination over optical fiber employing instantaneous frequency control by VCO", IEEE Conferences, 2012 IEEE/MTT-S International Microwave Symposium Digest, Jun. 17-22, 2012, 3 pages. (Year: 2012).*

(Continued)

*Primary Examiner* — Li Liu
(74) *Attorney, Agent, or Firm* — Nixon & Vanderhye PC

(57) ABSTRACT

In an aspect, an apparatus for distribution of frequency reference to a receiving end over a transmission medium comprises a first mixer adapted to mix a frequency reference signal having a reference frequency with a local oscillator signal having a local oscillator frequency to provide a forward frequency reference signal, a communication section adapted to transmit the forward frequency reference signal and receive a first backward frequency reference signal, a second mixer adapted to mix the first backward frequency reference signal with the local oscillator signal to provide a second backward frequency reference signal and a phase comparator and control circuit adapted to adjust the local oscillator frequency based on a phase shift of the second backward frequency reference signal so as to compensate for a phase shift of the forward frequency reference signal.

20 Claims, 9 Drawing Sheets

(51) Int. Cl.
*H04L 7/00* (2006.01)
*G06F 1/14* (2006.01)
*H04B 10/11* (2013.01)
*H04Q 11/00* (2006.01)

(52) U.S. Cl.
CPC ............ *H04B 10/11* (2013.01); *H04L 7/0075* (2013.01); *H04B 2215/064* (2013.01); *H04B 2215/065* (2013.01); *H04J 2203/0076* (2013.01); *H04Q 2011/0045* (2013.01); *H04Q 2213/1336* (2013.01); *H04Q 2213/13214* (2013.01); *H04Q 2213/13361* (2013.01); *H04Q 2213/214* (2013.01)

(56) References Cited

OTHER PUBLICATIONS

Kiuchi, "Optical Transmission Signal Phase Compensation Method Using an Image Rejection Mixer", IEEE Photonics Journal, vol. 3, No. 1, Feb. 2011, pp. 89-99 (Year: 2011).*

Krehlic et al., "Fiber-Optic Joint Time and Frequency Transfer With Active Stabilization of the Propagation Delay", IEEE Transactions on Instrumentation and Measurement, vol. 61, No. 10, Oct. 2012, pp. 2844-2851 (Year: 2012).*

Tomohiro Akiyama, et al., "Phase stabilized Rf reference signal dissemination over optical fiber employing instantaneous frequency control by VCO", IEEE Conferences, 2012 IEEE/MTT-S International Microwave Symposium Digest, Jun. 17-22, 2012, 3 pages.

H. Kiuchi, "Optical Transmission Signal Phase Compensation Method Using an Image Rejection Mixer", IEEE Photonics Journal, vol. 3, No. 1, Feb. 1, 2011, 12 pages.

Przemyslaw Krehlic, et al., "Fiber-Optic Joint Time and Frequency Transfer With Active Stabilization of the Propagation Delay", IEEE Transactions on Instrumentation and Measurement, IEEE Service Center, vol. 61, No. 10, Oct. 1, 2012, pp. 2844-2851.

Finnish Search Report for FI Application No. 20175838 dated Apr. 4, 2018, 2 pages.

Office Action for FI Application No. 20175838 dated Apr. 4, 2018, 6 pages.

Notice of Allowance for FI Application No. 20175838 dated Feb. 20, 2020, 5 pages.

International Search Report for PCT/FI2018/050679 dated Jan. 7, 2019, 3 pages.

Written Opinion of the ISA for PCT/FI2018/050679 dated Jan. 7, 2019, 6 pages.

* cited by examiner (a)

(b)

LONG-DISTANCE RF FREQUENCY AND TIME TRANSFER

This application is the U.S. national phase of International Application No. PCT/FI2018/050679 filed Sep. 20, 2018 which designated the U.S. and claims priority to FI Patent Application No. 20175838 filed Sep. 21, 2017, the entire contents of each of which are hereby incorporated by reference.

TECHNICAL FIELD

The invention relates to transfer of frequency and time.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Distribution of time and frequency references with high accuracy across large distances is necessary in many applications such as telecommunications and navigation as well as in many scientific endeavors. There are many factors which may cause delay fluctuations in transmission between a transmitter and a receiver resulting in inaccuracy in the received frequency and/or time reference. For example, if an optical fiber is used as the transmission medium, the delay time is affected by changes in temperature, mechanical stresses distributed along the link and vibrations. The temperature has usually the most significant effect as it affects both the physical length of the fiber as well as the refractive index of the silica glass of the fiber. Even larger fluctuations may occur if the distribution is organized over air.

Several solutions for reducing the propagation instability are based on the idea of redirecting a part of the signal from the receiver back to the transmitter and arranging a feedback system in the transmitter for compensating for the fluctuation of the phase caused by the transmission medium. Krehlik et al., IEEE Trans. Instrum. Meas. 63, 993 (2016) discloses one such solution for time and frequency transfer: the so-called electronically stabilized fiber-optic time and frequency distribution system (ELSTAB). In the ELSTAB technique, instead of trying to compensate for the phase fluctuations in the optical domain, the compensation is performed at lower frequencies. Typically, the initial frequency reference signal is a radio signal (e.g., with a frequency of 10 MHz). This radio signal is converted to an optical signal before transmission via the optical fiber to the receiver and an optical signal is converted to a radio signal when a signal is received from the receiver. In performing phase compensation, ELSTAB relies on using of a pair of electrically tunable, matched delay lines working at radio frequencies. One delay line is placed in the forward path, carrying the signal to be transmitted from the transmitter to the receiver, and the other in the backward path, carrying the signal received by the transmitter from the receiver. By changing the relative delays induced by the pair of delay lines in unison, it is possible to compensate for the delay fluctuations occurring in the optical fiber.

The ELSTAB technique as described above has demonstrated very high performance even over distances of hundreds of kilometers and may be used for both frequency and time transfer. However, one disadvantage of the ELSTAB is that the electrically tunable delay lines have fairly limited phase range in the tuning meaning that arbitrary phase shifting cannot be achieved. Moreover, the tunable delay lines should exhibit extremely low phase noise and be precisely matched in terms of the tuning characteristics meaning that realizing such delay lines presents a significant design and manufacturing challenge. Krehlik et al., IEEE Trans. Instrum. Meas., 61, 2844 (2012) discloses an alternative solution which incorporates optical fibers as additional constant delay lines and uses electronic switches to switch between said optical delay lines. Additionally, a hold over oscillator is also needed.

Clearly, overcoming the phase range limitation in the described manner increases the complexity of the solution significantly. Thus, a need for a simple, yet effective solution still exists.

BRIEF DESCRIPTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description. According to an aspect, there is provided the subject matter of the independent claims. Embodiments are defined in the dependent claims.

An aspect of the present invention is to provide a simple but robust solution for frequency and time transfer over long distances. Specifically, embodiments of the invention present an improvement over the prior art relating to the dynamic phase shifting necessary in some of the known techniques, for example, in the ELSTAB technique, to compensate for the phase fluctuations in the transmission medium (e.g., an optical fiber). While prior art solutions may offer only a limited range for the phase compensation, the range of the phase compensation achieved with embodiments of the invention is practically unlimited. This improved phase compensation range over the prior art is achieved by performing the phase shifting using a pair of radio frequency (RF) mixers of the same type in which a tunable oscillator signal to both the transmitted frequency reference (forward) and feedback (backward) RF signals.

While in some embodiments of the invention are targeted towards fiber-optic communications, in other embodiments the invention may be applied towards mobile communications (e.g., communication between two base stations) or an alternative wired transmission medium may be used.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
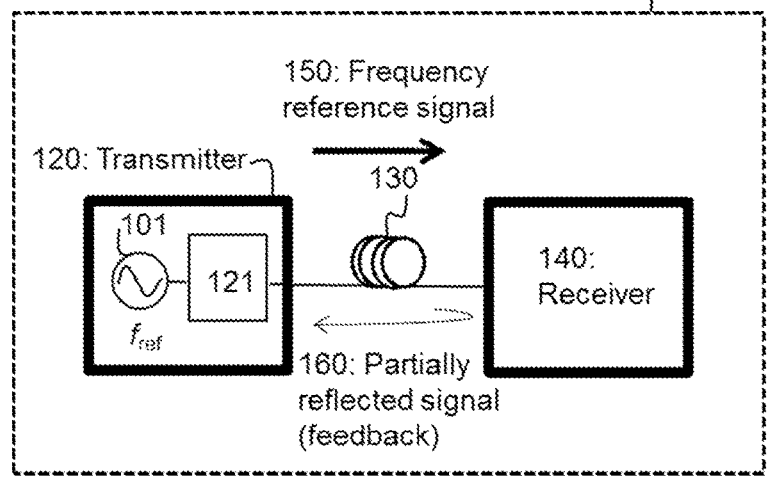
FIG. 1 illustrates the basic principle of frequency and time transmission using feedback.

FIG. 1 illustrates the basic principle of an exemplary frequency transfer, and optionally time transfer, system using feedback from the receiver. The illustrated, simplified exemplary frequency and time transfer system 100 may comprise a transmitter 120, a receiver 140 and a transmission medium 130, such as an optical fiber, connecting the transmitter 120 and the receiver 140.

The frequency to be transferred may be provided by a frequency reference oscillator 101 that may be comprised in or connected to the transmitter 120. The frequency reference oscillator 101 providing a frequency reference signal with an extremely stable frequency $f_{ref}$ may be based on, for example, a hydrogen maser, a cesium standard such as a cesium fountain or a combination of cesium standards and/or hydrogen masers. Since time is inversely proportional to frequency, the frequency reference may be considered equivalently a frequency standard or a time standard. The frequency reference signal may be an electrical frequency signal which may be converted to an optical frequency before transmission through the optical fiber 130. The terms "electrical frequency signal" as well as "electrical signal" should be understood here and in the following to mean a signal frequency of which is below the optical frequency range (visible part of the electromagnetic spectrum), preferably corresponding to radio frequencies. Radio frequencies are defined here and in the following, according the common definition, as a frequency range of 3 kHz to 300 GHz. The frequency reference oscillator 101 may be integrated into the transmitter 120, as shown in FIG. 1, or it may be a separate device connected to a transmitter 120 without an integrated frequency reference oscillator. Particularly in the latter case, the frequency reference signal from a single frequency reference oscillator may be shared to multiple transmitters 120, each connected to a different receiver 140.

When the frequency reference signal 150 is transmitted from the transmitter 120 to the receiver 140 via a transmission medium such as the optical fiber 130 (typically a single-mode optical fiber), which may be tens or even hundreds of kilometers long, various environmental effects (e.g., changes in temperature and vibrations) may cause fluctuations in the phase of the signal received by the receiver 140 (or equivalently fluctuations in observed frequency or delay). In other words, the stability of the original frequency reference is lost during transmission. Similar problems occur in other possible transmission media comprising, for example, free-space transmission (transmission over air) using antennas and guided radio transmission media such as coaxial or other types of cables. Therefore, special measures must be undertaken to secure the stability of the frequency reference when it is transmitted over long distances. A commonly known solution is to partially reflect the transmitted frequency reference signal 150 or to transmit a copy of the transmitted frequency reference signal 150 from the receiver back to the transmitter and to use this feedback signal 160 in the transmitter in some way to compensate for the phase fluctuations caused by the transmission medium.

The basic operation of such a feedback-based frequency reference system 100 may be best described using a simple example. In the initial conditions, the optical fiber medium 130 induces a one-way phase shift of $\varphi_{fiber}$ to the frequency reference signal 150. The system 100 has to be calibrated in some way to compensate for this phase shift so that the signal received by the receiver 140 is the same as the transmitted signal with required accuracy. This may be achieved simply by inducing a phase shift of $-\varphi_{fiber}$ before transmitting the signal. However, if the temperature rises slightly or the conditions for the optical fiber change in some other way, the phase shift induced by the fiber starts to drift such that after some time the optical fiber induces a one-way phase shift of $\varphi_{fiber}+\Delta\varphi_{fiber}$. Without tuning the applied phase compensation, the accuracy of the frequency reference would be deteriorated. The feedback signal 160 may be used for taking into account the time dependency of the phase fluctuations. As the feedback signal 160 encounters a two-way phase shift of $2(\varphi_{fiber}+\Delta\varphi_{fiber})$ relative to the frequency reference signal, the information on the phase shift $\varphi_{fiber}+\Delta\varphi_{fiber}$ caused by the transmission medium is relayed to the transmitter and may be used by a phase-locked loop (PLL) structure or another type of feedback structure (element 121) for dynamic phase compensation.

While the basic principle behind the frequency transfer phase compensation is simple, the question of how to realize the phase compensation in the transmitter (in block 121) is not a trivial one. A solution used in the ELSTAB technique is to realize the compensation using a set of matched, tunable delay lines to induce needed phase shifts in the forward and backward paths inside the transmitter as described above. Embodiments of the present invention propose the mixing of a tunable oscillator signal to both the transmitted frequency reference (forward) and feedback (backward) RF signals in two RF mixers, for achieving said compensation. The key benefits of the present solution compared to the prior art are the significantly extended, practically limitless range of the phase compensation and the simplicity of design and ease of manufacturing without compromising very high level of performance.

Figure 2:
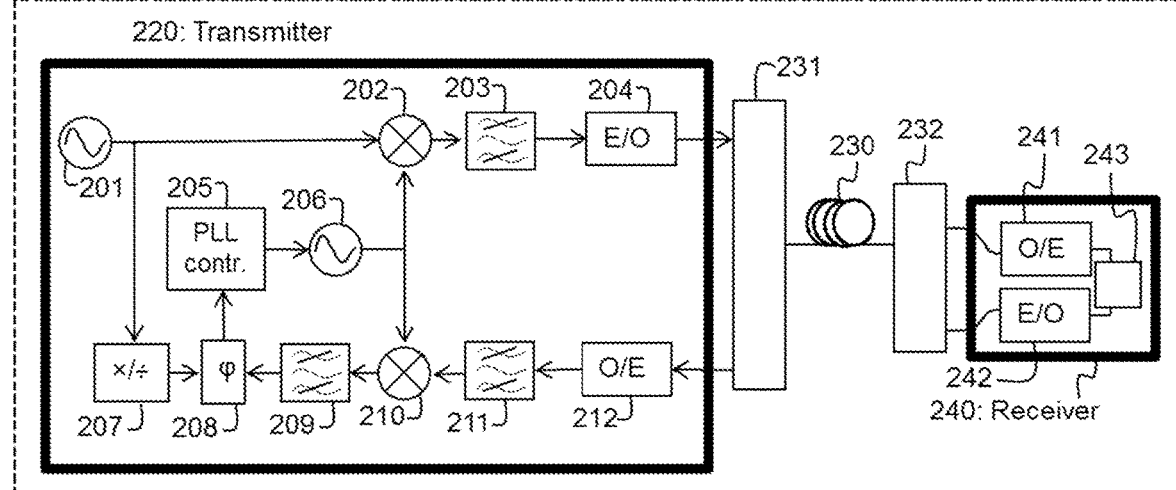
FIG. 2 illustrates a system to which embodiments of the invention may be applied.

FIG. 2 illustrates a detailed frequency transfer system 200 according to an exemplary embodiment of the invention. Similar to FIG. 1, the frequency transfer system 200 may comprise a transmitter 220, a receiver 240 and an optical fiber medium connecting the transmitter 220 and the receiver 240. Furthermore, the frequency transfer system 200 may comprise two wavelength-division multiplexers 231, 233, one at each end of the optical fiber 232. The frequency reference oscillator 201 may be similar to the frequency reference oscillator 101 as described in relation to FIG. 1 while elements 202 to 212 and 231 may correspond to block 121 of FIG. 1. The system illustrated in FIG. 2 may also be used for transferring a time reference if a few additional elements are introduced to the transmitter 220 and the receiver 240 as will be discussed in detail in relation to FIGS. 7 and 8.

In the following, it is assumed for simplicity that the frequency reference signal and the local oscillator signal created by the frequency reference oscillator 201 and voltage controlled oscillator 206, respectively, are radio frequency (RF) signals (comprising frequencies between 3 kHz and 300 GHz) which are converted to optical signals before transmission via the wavelength-division multiplexer 231 and the optical fiber 230 and back to radio frequency signals upon reception by the electrical-to-optical (E/O) and optical-to-electrical (O/E) converters 204, 212, respectively. Similarly, the receiver 240 is an RF receiver with only the E/O and O/E converters 241, 242 and the wavelength-division multiplexer 232 working at optical frequencies. It should be appreciated that the optical transmission medium and the implementation thereof are not relevant to embodiments of the invention, although embodiments of the invention provide significant benefits especially in connection with very long transmission distances of the optical transmission medium.

In the exemplary embodiment, a pair of RF mixers 202, 210 is used for creating needed phase shifting or equivalently frequency shifting in the forward (signal to be transmitted) and backward (received signal) paths, respectively, inside the transmitter such that the phase fluctuations caused by the transmission medium such as the optical fiber may be compensated. Specifically, the RF mixer 202, preferably an up-converting mixer, is used to mix the local oscillator signal having a local oscillator frequency $f_{LO}$ from the voltage controlled oscillator 206 with the frequency reference signal having a reference frequency $f_{ref}$ from the frequency reference oscillator 201 in the forward path. Moreover, the RF mixer 210, preferably of the same type as the RF mixer 202 which is preferably an up-converting mixer, is used to mix the local oscillator signal $f_{LO}$ with the feedback signal with frequency $|f_{ref} \pm f_{LO}|$ received by the transmitter in the backward path. The output signal from the mixer 202 with frequency $|f_{ref} \pm f_{LO}|$ is transmitted to the receiver while the output signal from the mixer 210 with frequency $|f_{ref} \pm 2f_{LO}|$ is used in controlling the voltage controlled oscillator 206 in a phase-locked loop, that is, for realizing the needed phase compensation, as will be described later. The RF mixers 202, 210 may be used either to up- or down-convert the reference and feedback signals depending on the frequencies produced by the oscillators 201, 206. The up-converting type of mixers are more preferable because the higher transmission frequencies are beneficial. The RF mixers 202, 210 shall have the same mixing operation so that they cause similar phase shifting for the forward and backward paths. Exemplary configurations of the frequency transfer system 200 will be discussed later. The RF mixers 202, 210 may be based on any present or future mixer technologies working at radio frequencies. For example, they may be based on the use of diodes or transistors. The RF mixers 202, 210 may comprise one or more unbalanced mixers, one or more single balanced mixers and/or one or more double balanced mixers. One or more of the RF mixers may also be active.

Mixers typically produce in their output mixing products corresponding to both a sum $f_{ref}+f_{LO}$ and a (positive) difference $|f_{ref}-f_{LO}|$ of the input frequencies $f_{ref}$, $f_{LO}$ (side bands) and a multitude of higher order intermodulation products and harmonics (spurious signals). Several of these signal components corresponding to the input frequencies may also be included in the output signal of the mixer. As usually only a single signal component is desired (typically the sum $f_{ref}+f_{LO}$ or the difference $|f_{ref}-f_{LO}|$ of the input frequencies), a bandpass filter may be used at the output of the mixer to pass the desired signal component and to filter out the unwanted signal components. Accordingly, the RF mixers 202 and 210 may be followed by bandpass filters 203 and 211, respectively. In some embodiments, one or both of the bandpass filters 203, 211 may be omitted from the frequency transfer system 200. This may be possible, for example, if the RF mixers 202, 210 are double-balanced mixers, that is, mixers which suppress the input frequency signals from the output signal and if the frequencies of the frequency reference oscillator and voltage controlled oscillator are chosen so that higher order intermodulation products and harmonics are relatively weak and/or far from the wanted frequency.

The amount of phase compensation that needs to be applied to the frequency reference signal in the transmitter 120 before transmission to compensate for the phase fluctuation in the optical fiber (or in any other transmission medium) at any given time may be determined in a phase-locked loop formed at least by the voltage controlled oscillator 206, the RF mixer 210, a phase detector 208 and a phase-locked loop controller 205. The phase-locked loop controller 205 may be a PLL loop filter (usually a low pass filter). As described above, a bandpass filter 209 may also be used after the RF mixer 210.

A fundamental property of any phase-locked loop is that the phase and frequency of the local oscillator signal originating from the voltage controlled oscillator and fed back to the phase detector is kept locked to the input signal (frequency reference signal from the frequency reference oscillator 201, possibly frequency-converted by multiplier to $N*f_{ref}$ or by a divider 207 to $f_{ref}/N$, wherein N may be a positive integer) by adjusting the instantaneous oscillation frequency $f_{LO}$ of the voltage controlled oscillator 206. As the local oscillator signal $f_{LO}$ from the voltage controlled oscillator 206 is mixed with the received frequency reference signal (the backward signal) before it is fed to the phase detector 208, any phase fluctuation $\Delta\varphi_{fiber}$ caused by the optical fiber is carried over to the mixed signal as well, directly affecting the phase lock. Moreover, as the local oscillator signal from the voltage controlled oscillator 206 is mixed also with the frequency reference signal to be transmitted (the forward signal), any phase compensation $\Delta\varphi$ caused by the phase-locked loop (that is, the voltage controlled oscillator 206) is included in the transmitted frequency reference signal leading to phase compensation for the fluctuations in the optical fiber for the frequency reference signal received by the receiver 240.

In the following, exemplary operation of the phase-locked loop and its elements 202, 205, 206, 208, 209, 210 is discussed in more detail. The phase detector 208 is used to detect the phase difference between two signals corresponding effectively to the forward signal and the backward signal in the transmitter and generate an output voltage corresponding to said phase difference. Before the forward signal (frequency reference signal from the frequency reference oscillator 201) is fed to the phase detector 208, it may be frequency-converted by a frequency multiplier or divider 207 to substantially match the frequency of the backward signal which has been mixed by the RF mixer 210 with the local oscillator signal from the voltage controlled oscillator. It should be noted that the frequency multiplier or divider 207 is not necessary if the frequencies of the oscillators and the mixing products used are chosen so that the signals have substantially equal frequency. It should be appreciated that here and in the following substantially matching or substantially equal frequencies should be understood to mean that the two frequencies differ from each other only due to the small phase fluctuations caused by the optical fiber or the small frequency shift caused by the voltage controlled oscillator 206.

The output of the phase detector 208 is monitored by the PLL controller 205. The PLL controller 205 keeps the output of the phase detector 208 at a constant value (typically zero volts) by controlling the voltage fed to the voltage controlled oscillator 206. This voltage, in turn, directly affects the output instantaneous oscillation frequency $f_{LO}$ of the voltage controlled oscillator 206 by inducing a phase shift and/or a frequency shift compared to the quiescent frequency of the voltage controlled oscillator. As described above, the local oscillator signal from the frequency controlled oscillator 206 is fed to the RF mixer 210 output of which is fed to the phase detector 208 (possibly after filtering) thus completing the loop.

It should be appreciated that the phase shift induced by the RF mixer 202 for compensating the phase fluctuations in the optical fiber 230 or any other transmission medium is an integral of the frequency shift induced by the voltage controlled oscillator 206. Therefore, the range of the phase compensation achievable with embodiments of the invention can be considered practically unlimited. The phase shift obtained as a result of the frequency shift increases linearly with time without limit.

In addition to the bandpass filters 203, 209 following the RF mixers 202, 210, a further filter 211 may be included following the O/E converter 212. Said filter 211 may also be a bandpass filter and is used to clean out the received feedback signal before it is fed to the RF mixer 210.

Before the frequency reference signal mixed with the local oscillator signal from the voltage controlled oscillator 206 may be transmitted to the receiver 240 via the optical fiber 230, the electrical forward signal has to be converted to an optical signal by the E/O converter 204. Conversely, upon reception the optical backward signal must be converted to an electrical backward signal by the O/E converter 212. The E/O conversion 204 may be realized, for example, by modulating a laser with the radio frequency signal to be transmitted while the O/E converter 212 may be, for example, based on a photodetector demodulating the electrical signal from the modulated optical signal. The E/O converter 204 and the O/E converter 121 may function in a symmetric manner or preferably, they may be configured slightly differently to enable the use of slightly different optical frequencies or wavelengths in forward and backward directions. Having different forward and backward optical frequencies or wavelengths in bi-directional transmission in an optical fiber using wavelength-division multiplexing has the benefit of preventing unwanted coupling as will be discussed in the next paragraph.

Multiplexers 231, 232 are used for coupling the signal to be transmitted to the optical fiber 230 and the signal to be received to the receiving device (in this case, either the transmitter 220 or the receiver 240). If different optical frequencies or wavelengths are used in forward and backward directions, the multiplexers 231, 232 may be based on wavelength-division multiplexing so that signals propagating in the forward direction and having a first wavelength (frequency) are guided only to the O/E converter 241 and signals propagating in the backward direction and having a second wavelength are guided to the O/E converter 212. This way any possible unwanted leakage and/or backscattering to the E/O converters is prevented. In some embodiments, optical circulators may be used instead of the multiplexers 231, 232.

In other embodiments, the multiplexers 231, 232 may be based on other types of multiplexing such as polarization-division multiplexing. If polarization-division multiplexers are used, there is no need for using different wavelengths for forward and backward propagation directions, but a pair of polarization rotators may be needed to realize orthogonal polarizations. Moreover, the use of advanced channel coding may be necessary to account for drifts in polarization state occurring in the transmission medium (particularly, in optical fiber). In an embodiment, a Faraday (rotator) mirror may be used in the receiver to reflect the received frequency reference signal such that the polarization plane of the reflected signal is rotated by 90° relative to the received frequency reference signal making said two signals orthogonal to each other.

The receiver 240 may comprise at least an O/E converter 241, an E/O converter 242 and a partial reflector 243. It should be appreciated that the specifics of the receiver design are not significant for the present invention and FIG. 2, to this end, illustrates only a simplified schematic of the receiver 240, comprising only elements having significance for the present invention. The receiver 240 (and in particular element 243) may also comprise any equipment comprised in a typical RF receiver such as filters, amplifiers and/or mixers.

As described above in relation to FIG. 1, the most important function of the receiver 140, 240 in view of the present invention is the reflection or retransmission of the received frequency reference signal back to the transmitter 120, 220. In FIG. 2, this is achieved by using a partial reflector 243 which splits the received electrical frequency reference signal such that a part of the received electrical frequency reference signal is reflected to the E/O converter 242. Rest of the received electrical frequency reference signal may be used for detection. The partial reflector may be a passive component or an active component which may also amplify the reflected frequency reference signal. In some embodiments, an optical partial reflector may be employed for reflecting the optical signal, before the O/E conversion to an electrical signal. The above discussion regarding the E/O and O/E converters 204, 212 of the transmitter 220 applies also to the E/O and O/E converters 241, 242 of the receiver.

Figure 3:
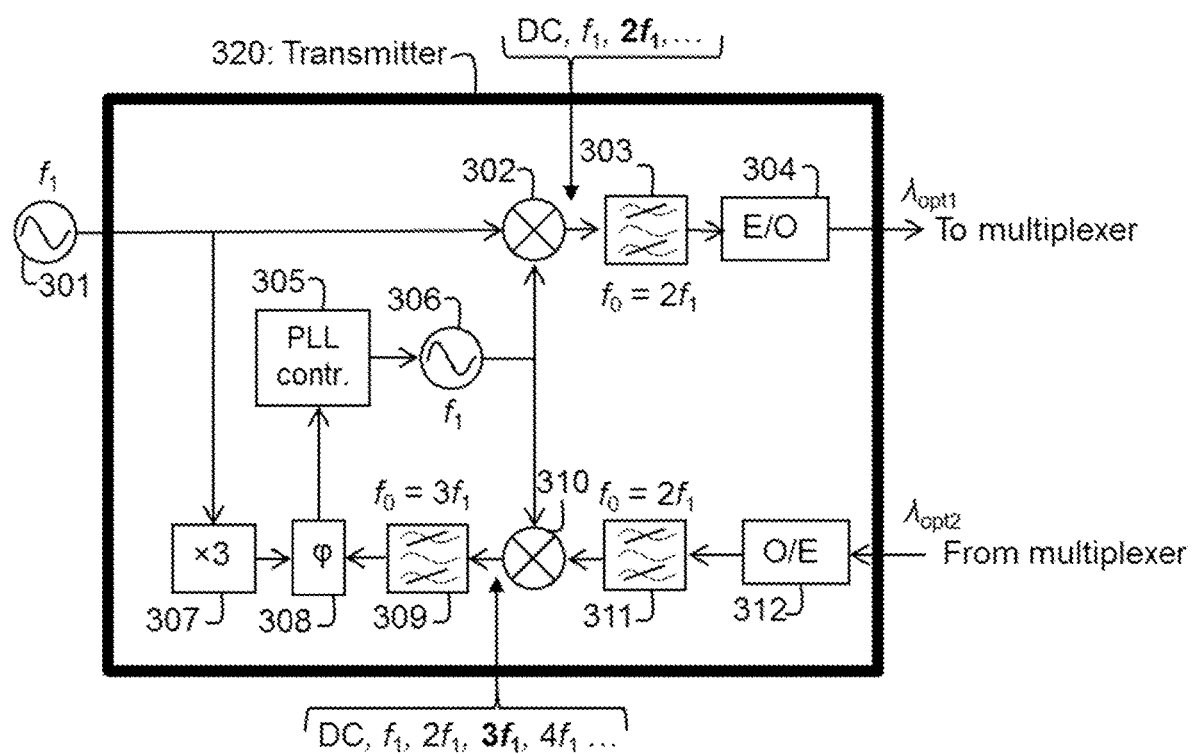
FIG. 3 illustrates an exemplary transmitter according to an embodiment of the invention.
Figure 4:
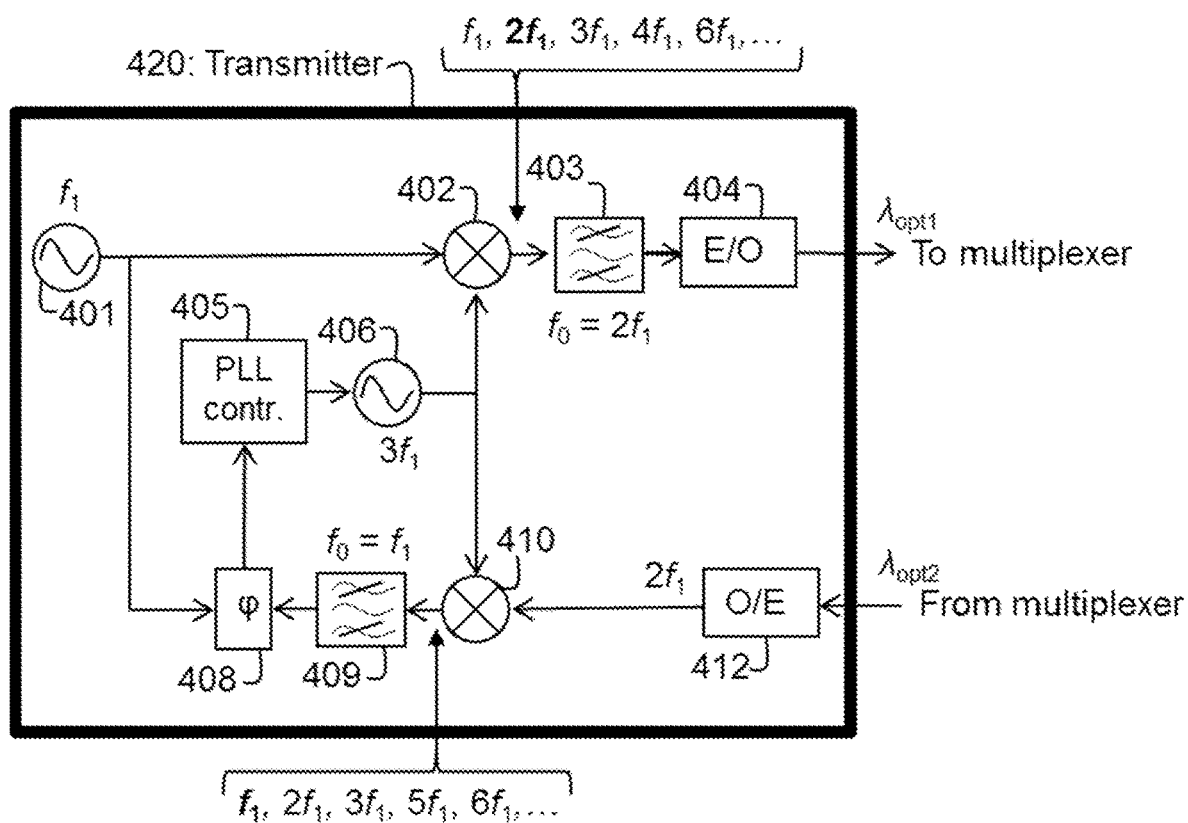
FIG. 4 illustrates an exemplary transmitter according to an embodiment of the invention.

In the following, exemplary operation of the frequency transfer system 200 is described using two examples with particular parameters and/or settings for the elements comprising the transmitter illustrated in FIG. 2. While FIGS. 3 and 4 illustrating said two examples show only transmitters 320, 420, it should be understood that each transmitter 320, 420 may be connected via multiplexers and a transmission medium (e.g., an optical fiber) to a receiver forming a frequency transfer system as described in relation to the frequency transfer system of FIG. 2. Furthermore, it should be understood that the features included in the two examples may be freely combined.

In the following first example illustrated in FIG. 3, the frequency reference oscillator 301 is, contrary to FIG. 2, not integrated into the transmitter 320 but forms a separate device which may also be used to provide the reference frequency $f_{ref}$ simultaneously to other transmitters (not shown in FIG. 3). In an embodiment, the provided reference frequency $f_{ref}$ may have been frequency-multiplied to provide a higher frequency for frequency transfer than what is directly obtained from the frequency reference. For example, 5 MHz or 10 MHz are common standard frequencies used in high-quality quartz crystal oscillators, but these frequencies may not be ideal for the purposes of frequency transfer necessitating frequency-multiplication. Moreover, it is assumed that the frequency $f_{ref}$ of the frequency reference signal produced by the frequency reference oscillator 301 is equal to the quiescent frequency $f_{LO}$ of the voltage controlled oscillator 306, for example, $f_{ref}=f_{LO}=f_1=100$ MHz.

Initially, the voltage controlled oscillator 306 produces a local oscillator signal with a frequency corresponding to the quiescent frequency $f_1$ of the voltage controlled oscillator 306. When the two signals produced by the two oscillators 301, 306 are mixed by the RF mixer 302, a sum mixing product having a frequency $f_1+f_1=200$ MHz is produced which is defined here as the wanted mixing product to be used for transmission. The RF mixer 302 produces also a direct current mixing product as the difference between the two equal input signal frequencies $f_1$ is zero, and higher intermodulation products and harmonics may also be generated. A signal corresponding to the input frequency $f_1$ may also be included in the output. To eliminate the unwanted frequency components, the bandpass filter 303 has a narrow passband around 200 MHz.

Next, the electrical signal having a frequency of 200 MHz is converted to an optical signal by the E/O converter 304 by modulating laser light having a wavelength $\lambda_{opt1}=1547.72$ nm. The modulated optical signal is guided by the multiplexers and the optical fiber to the O/E converter of the receiver where it is converted back to an electrical signal having a radio frequency $2f_1=200$ MHz. A phase shift of $\varphi_{fiber}$ compared to the original transmitted frequency reference signal is induced by the optical fiber. The received electrical signal is partially reflected by the reflector to the E/O converter which converts the reflected electrical signal to a reflected optical signal by modulating laser light having a wavelength $\lambda_{opt2}=1548.53$ nm, that is, slightly different wavelength compared to the laser in the E/O converter 304 of the transmitter 320. The reflected optical signal is guided by the multiplexers and the optical fiber to the O/E converter 312 of the transmitter 320 where it is converted back to an electrical signal having a frequency $2f_1=200$ MHz. Again, a phase shift of $\varphi_{fiber}$ compared to the original transmitted frequency reference signal is induced by the optical fiber. The bandpass filter 311 having a passband around $2f_1=200$ MHz is used to clean out the reflected electrical signal following the conversion.

The received reflected signal is mixed after the filtering with the local oscillator signal from the voltage controlled oscillator by the RF mixer 310 which is identical in operation to the RF mixer 302. However, now the input signals have different frequencies: $f_1=100$ MHz and $2f_1=200$ MHz. Therefore, the output signal from the RF mixer 302 has at least the frequency components $2f_1-f_1=100$ MHz and $f_1+2f_1=300$ MHz of which the sum of $f_1$ and $2f_1$ is the wanted mixing product. Another bandpass filter 309 having bandpass around 300 MHz may be used to filter out the unwanted frequency components. It should be noted that both RF mixer—bandpass filter pairs 302, 303 and 309, 310 are used specifically for generating a signal corresponding to a sum of the two input frequencies, i.e. $f_1+f_1=200$ MHz and $f_1+2f_1=300$ MHz, respectively. This way any frequency shift in the output frequency of the voltage controlled oscillator 306 affects frequency of the forward and backward signals in the same way (frequency-shifting in the same direction). If the two wanted mixing products in the two RF mixers would correspond to a sum and a difference, it would not be possible to resolve the phase fluctuations and compensate for them as the frequency shifts induced by the two mixers would effectively cancel out.

The filtered signal with frequency 300 MHz and phase shift of $2\varphi_{fiber}$ compared to the frequency reference signal due to the optical fiber is fed to the phase detector 308. In order to cause the frequency reference signal initially generated by the frequency reference oscillator to have the same frequency $3f_1$ as the feedback signal for comparing the phases, the frequency reference signal is frequency-multiplied by three in a frequency multiplier 307 before it is fed to the phase detector 308. Assuming no phase fluctuation in the optical fiber compared to the initial conditions has happened, the phase difference between the two signals corresponds to $2\varphi_{fiber}$. The PLL controller 305 is configured to to maintain a constant phase difference between the frequency-multiplied frequency reference signal and the feedback signal by applying a voltage to the voltage controlled oscillator such that the output frequency of the voltage controlled oscillator is shifted to compensate for the phase fluctuation in the transmission medium. When the phase shift caused by the optical fiber changes slightly so that the two-way phase shift over the fiber is $2\varphi_{fiber}+2\Delta\varphi_{fiber}$, the PLL controller 305 automatically tunes the induced phase shift to take the additional phase fluctuation into account.

Some additional phase shifts, in addition to $2\varphi_{fiber}$, to the filtered signal to be fed to the phase detector 308 may be caused by the RF elements 302, 303, 304, 309, 310, 311, 312 of the transmitter 320 and the RF elements of the receiver. The phase detector 308 may be calibrated to take into account these additional phase shifts when comparing phases of its input signals.

The quiescent frequency $f_{LO}$ of the voltage controlled oscillator 306 does not have to be equal to the reference frequency $f_{ref}$ as in the previous example. Alternatively, the quiescent frequency $f_{LO}$ may be chosen to be a multiple of the frequency $f_{ref}$ of the frequency reference oscillator 301 or vice versa. For example, the reference frequency $f_{ref}$ may have a value $f_1=100$ MHz as in the first example and the quiescent frequency $f_{LO}$ of the voltage controlled oscillator may have a value of $3f_1=300$ MHz. A transmitter 420 configured in this way is illustrated in FIG. 4.

The operation of the transmitter 420 of FIG. 4 is for the most part similar to the transmitter of FIG. 3, but a few differences exist. Firstly, since the frequencies of the two oscillator 401, 406 are now different, different mixing products appear at the output of the RF mixer 402, namely at least frequencies $f_1=100$ MHz, $3f_1-f_1=2f_1=200$ MHz, $3f_1=300$ MHz, $3f_1+f_1=2*2f_1=4f_1=400$ MHz and $2*3f_1=6f_1=600$ MHz. In this example, the bandpass filter 403 is used filter out all the frequencies except the difference mixing product ($3f_1-f_1=2f_1=200$ MHz). The operation of the E/O converter 404, O/E converter 412, multiplexers, the optical fiber and the receiver may be as described in relation to other embodiments of the invention. However, in this example no bandpass filter is included after the O/E converter 412. Similar to the earlier embodiments, the RF mixer 402, 410 are assumed to operate in a similar manner and the type of the mixing product retained in the forward and backward paths in the transmitter 420 is the same (i.e., difference of the input signals in this case). Therefore, out of the frequency components produced by the RF mixer 410 ($3f_1-2f_1=f_1=100$ MHz, $2f_1=200$ MHz, $3f_1=300$ MHz and $3f_1+2f_1=5f_1=500$ MHz etc.), all but the component $f_1=100$ MHz are filtered out by the bandpass filter 409. As the output signal of the filter 409 has the same frequency as the frequency reference oscillator 401, no additional element (frequency multiplier/divider) is needed in this case to match the frequency of the reference oscillator to the feedback signal. However, since the frequency reference signal in the forward and backwards paths of the transmitter is subtracted from the local oscillator signal of the voltage controlled oscillator 406, the phase shift due to the optical fiber seen at the phase detector 408 corresponds to a negative of the actual two-way phase shift of the optical fiber (i.e., $-2\varphi_{fiber}-2\Delta\varphi_{fiber}$).

It should be emphasized that embodiments of FIGS. 3 and 4 are mere examples and the oscillators, the mixers and the filters may be configured or chosen in a variety of ways not explicitly disclosed here. As long as the mixers operate in a similar manner in the forward and backward paths in the transmitter, the same mixing product (a sum or a difference of the inputs signals of the mixer) is let through by the filters following the mixers and the reference frequency can be converted to match the feedback signal, the phase compensation is possible. Regarding the last condition, it should be noted that certain limitation do exist. Conventional frequency multipliers are based on generating harmonics (multiples) of the input frequencies while typical integer frequency dividers divide the input frequency by an integer value. Therefore, the generation of an arbitrary frequency is not possible. However, several options exist for converting frequency more freely. For example, a combination of one or more frequency multipliers and/or one or more frequency dividers or a frequency synthesizer may be used. While the former option is still restricted to fractional frequencies, the latter enables generation of practically arbitrary frequencies.

While FIGS. 1 to 4 illustrate frequency transfer systems 100, 200 where the transmitter and the receiver are connected via an optical fiber, it should be appreciated that other transmission means or media are also possible according to embodiments of the invention. For example, the transmission medium may also be one or more transmission lines operating at radio or terahertz frequencies, free-space transmission using antennas operating at radio or terahertz frequencies or free-space transmission using a combination of antennas and lasers according to any future laser-radio technologies. Obviously, if the transmission medium works at the same (radio) frequencies as the transmitter and receiver, no frequency conversion is needed in the form O/E and E/O converters.

Figure 5:
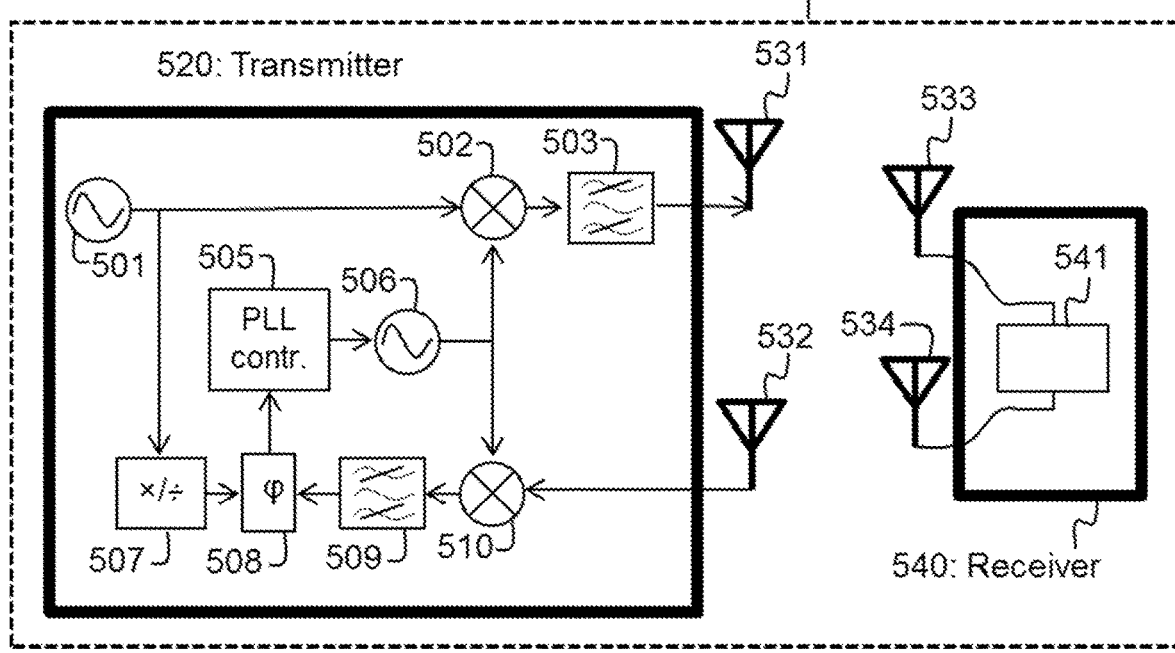
FIG. 5 illustrates a system to which embodiments of the invention may be applied.

FIG. 5 illustrates an exemplary embodiment of a frequency transfer system 500 where two pairs of antennas 531, 532, 533, 534 are used for transferring the frequency reference from a radio transmitter 520 to a radio receiver 540. It is assumed here that the antennas operate at radio frequencies (and therefore no frequency conversion is needed) and one antenna 531, 534 of each antenna pair is used for radio transmission and the other 532, 533 for radio reception. The antennas may be directive antennas. In some embodiments, non-directive antennas or antennas/antenna arrays with multiple lobes may be used in the transmitter 520 for delivering the frequency reference to multiple receivers 540 simultaneously (only one of which is shown in FIG. 5).

The components 501 to 503, 505 to 510 and 541 of FIG. 5 may correspond to the components 201 to 203, 205 to 210 and 241 of FIG. 2, respectively.

The transmitter 520 and the receiver 540 according to FIG. 5 may be implemented in two access nodes of a radio communications system to share the frequency reference with the other network nodes and/or terminal devices comprised in the radio communications system. The radio communications system may comprise at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunications System (UMTS, 3G) based on basic wide-band-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communications system. For example, the frequency transmitted by the transmitter to the receiver may be within the bandwidth 1930.2-1989.8 MHz and the frequency transmitted by the receiver back to the transmitter may be within the bandwidth 1850.2-1909.8 MHz so that the transmitter and the receiver may operate in a GSM system using the 1900 MHz GSM band.

Unwanted coupling from the transmitting antenna 531 of the transmitter 520 to the receiving antenna 532 of the transmitter 520 and to the transmitting antenna 534 of the receiver 540 as well as from the transmitting antenna 534 of the receiver 540 to the receiving antenna 533 of the receiver 540 and to the transmitting antenna 531 of the transmitter 520 may deteriorate the performance of the system 500. In order to prevent this, the pairs of antennas in the transmitter 520 and in the receiver 540 may operate at orthogonal polarizations. For example, the transmitting antenna 531 of the transmitter 520 and the receiving antenna 533 of the receiver 540 may have horizontal polarization and the transmitting antenna 534 of the receiver 540 and the receiving antenna 532 of the transmitter 520 may have vertical linear polarizations. Alternatively instead of antennas with horizontal and vertical polarizations, antennas with left- and right-handed circular polarizations may be used to achieve orthogonality. In some embodiments, isolators may be used in the transmitter 520 and/or the receiver 540 to prevent unwanted coupling.

Figure 6:
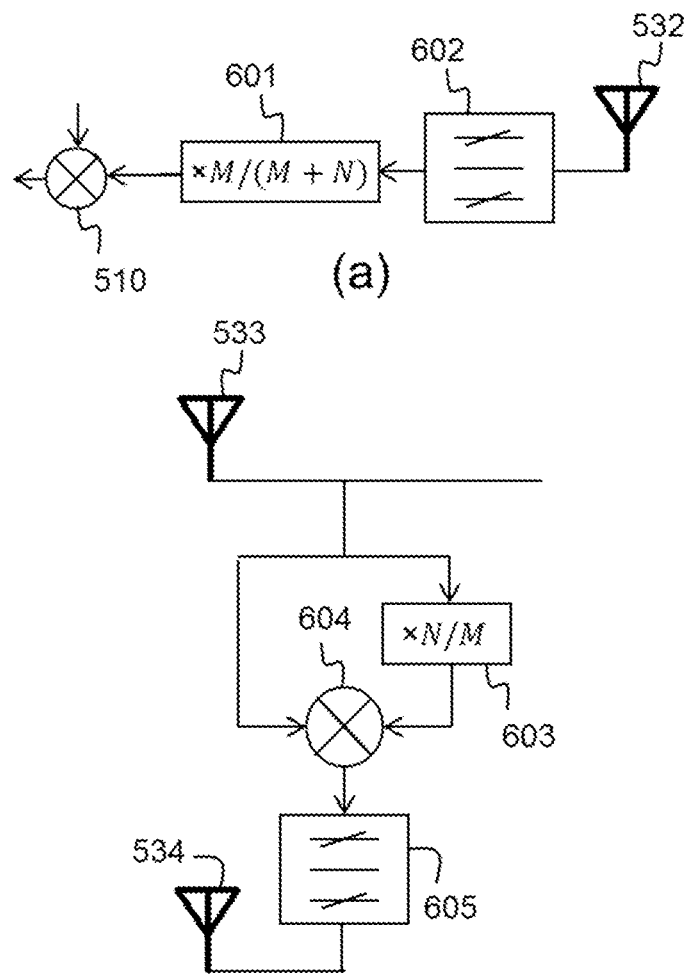
FIG. 6 illustrates a transmitter (a) and a receiver (b) according to an embodiment of the invention.

Alternatively, the problem of unwanted coupling may be solved by frequency-shifting the received frequency reference signal in the receiver 540 slightly so that spectral filters in the receiver and the transmitter may be used to separate the forward and backward signals. An exemplary embodiment of the invention where such functionality is realized is illustrated in FIG. 6, specifically in FIG. 6(a) for the transmitter 520 of FIG. 5 and in FIG. 6(b) for the receiver 540 of FIG. 5. Referring to FIG. 6(b), the frequency shifting may be achieved in the receiver by mixing, by the mixer 604, the received signal with a copy of itself which has been frequency-multiplied and/or frequency-divided by the multiplier/divider element 603. The resulting signal comprises frequency component with frequencies $f_{shifted}=(1+N/M)f$ and $f_{shifted}=(1-N/M)f$ where N is a multiplication factor, M is a division factor and f is the received frequency. If N/M is much smaller than one, said frequencies correspond to a small frequency shift. The output signal of the mixer 604 is fed to a filter 605 (preferably a bandpass filter) which allows only one of the aforementioned frequency-shifted components to pass. In the transmitting end, the reference frequency may also be changed accordingly. Referring to FIG. 6(a), another filter 602 (also preferably a bandpass filter) may be used in the transmitter to filter any received signals to allow only a frequency-shifted frequency reference signal to pass. After said filtering, the resulting signal may be frequency-multiplied and/or frequency-divided by the multiplier/divider element 601 to provide a backward frequency reference signal (without the frequency-shifting induced by the elements 603, 604, 605 of the receiver). The element 601 may comprise a multiplier, a mixer and/or a filter similar to elements 603, 604, 605 or any other means for countering the frequency shift induced by the receiver for achieving retransmission without unwanted coupling.

Obviously, the frequency shift induced by the mixer 604 should be small enough that the resulting frequency still remains within the operating bandwidth of the antennas 532, 534. In some embodiments, the dimensions of the antennas 531, 533 for transmitting/receiving the frequency reference signal without a frequency shift and the antennas 532, 534 for transmitting/receiving frequency-shifted signals may be slightly different to achieve slightly shifted operational bandwidth for the two pairs of antennas (531, 533 & 532, 534) and thus to ensure efficient transmission/reception. It should be appreciated that the unwanted coupling may be prevented by introducing the set of elements 601, 602, 603, 604, 605, 606 shown in FIG. 6 to any transmitter and receiver according to any embodiment of the invention.

Figure 7:
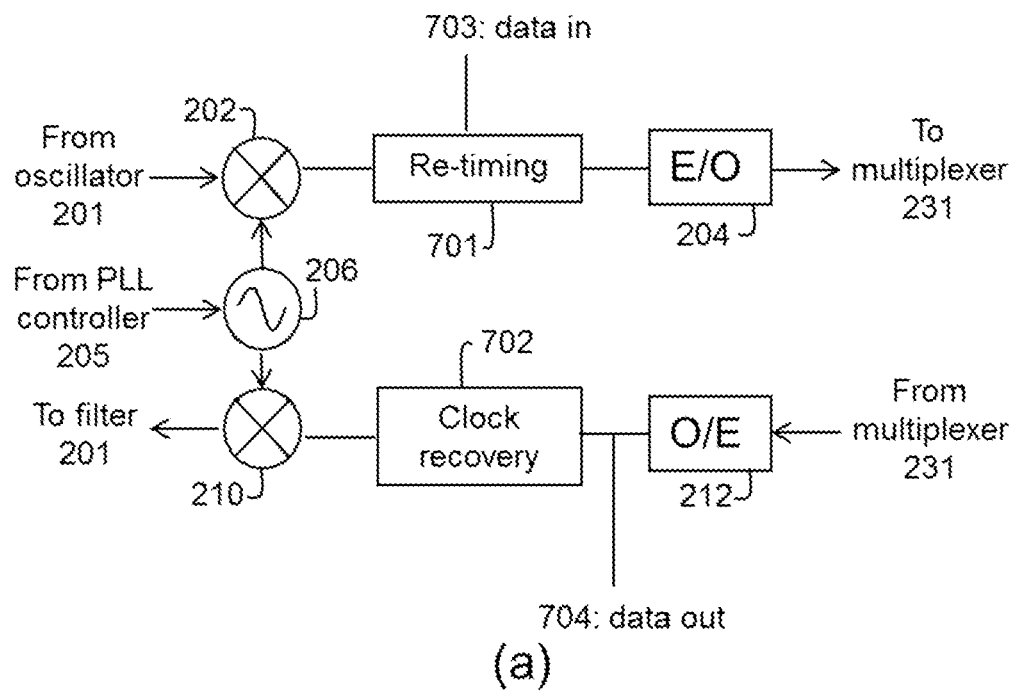
FIG. 7 illustrates a transmitter (a) and a receiver (b) according to an embodiment of the invention.
Figure 7:
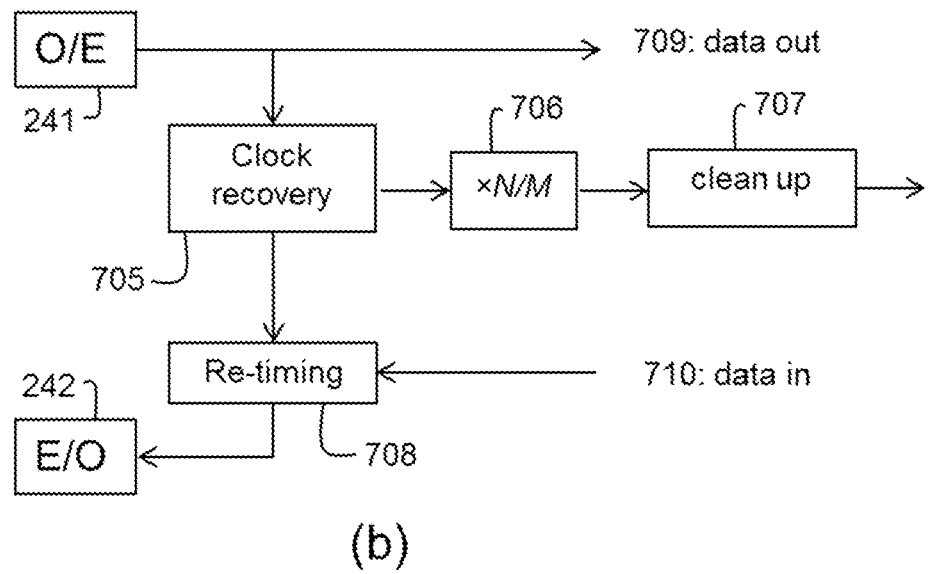

If data is to be transferred simultaneously with the transfer of the frequency reference using the frequency transfer system according to any aforementioned embodiment of the invention, re-timing of the data stream with respect to the reference frequency to be transmitted has to be performed in the transmitter in order to enable high-fidelity frequency transfer. Correspondingly, the receiver must be configured to be able to recover the transmitted data stream as well as the reference frequency. An exemplary embodiment of the invention for realizing these functionalities is illustrated in FIG. 7. FIG. 7 shows only the additional elements to the frequency transfer system of FIG. 2 needed for realizing the data transfer as well as neighboring elements to said additional elements. FIG. 7(*a*) corresponds to the transmitter side and FIG. 7(*b*) to the receiver side. It should be appreciated that similar additional elements may be added to any of the embodiments illustrated in FIGS. 3 to 6 to implement data transfer.

Referring to FIG. 7(*a*), the data transfer may be realized by the addition of two new elements to the transmitter of FIG. 2: a re-timing unit 701 and a clock recovery circuit 702. The re-timing unit 701 may re-time (synchronize) the clock frequency of the data stream to the reference frequency to be transmitted (that is, a corresponding mixing product of the RF mixer 202). The data stream may be provided as an input 703 of the re-timing unit 701. While the RF filter 203 is not explicitly shown in FIG. 7(*a*), the RF filter 203 may be included in the transmitter as a separate element as in FIG. 2 or it may be integrated into the re-timing unit 701. Naturally, the reference frequency to be transmitted must match the requirements of the data stream and must be equal on average to the clock frequency of the data stream. In the backward path inside the transmitter, the clock frequency of the received data stream (corresponding in this embodiment to the reference frequency) may be recovered from the received data stream using a clock recovery circuit 702. The recovered frequency, possibly multiplied, divided, and/or filtered, may then be used to complete the phase-locked loop as in the previous embodiments. A data output 704 may be provided between the O/E converter 212 and the clock frequency unit 702.

Referring to FIG. 7(*b*), the data transfer in the receiver may be realized in a similar but, in a sense, inverse manner compared to the transmitter. After receiving a frequency reference signal from the transmitter and converting the optical signal to an electrical signal, a clock recovery circuit 705 may be used to retrieve the clock frequency of the data stream, similar to the backward path of the transmitter. This frequency may then be used to re-time a data stream to be transmitted back to the transmitter using the re-timing unit 708. The recovered frequency may be filtered, multiplied, and/or divided by the element 706. A clean-up circuit 707 based on, for example, a low-noise oscillator in a phase-locked loop may also be used. A data output 709 may be provided after the O/E converter while a data input 710 may be integrated into the re-timing unit 708.

Figure 8:
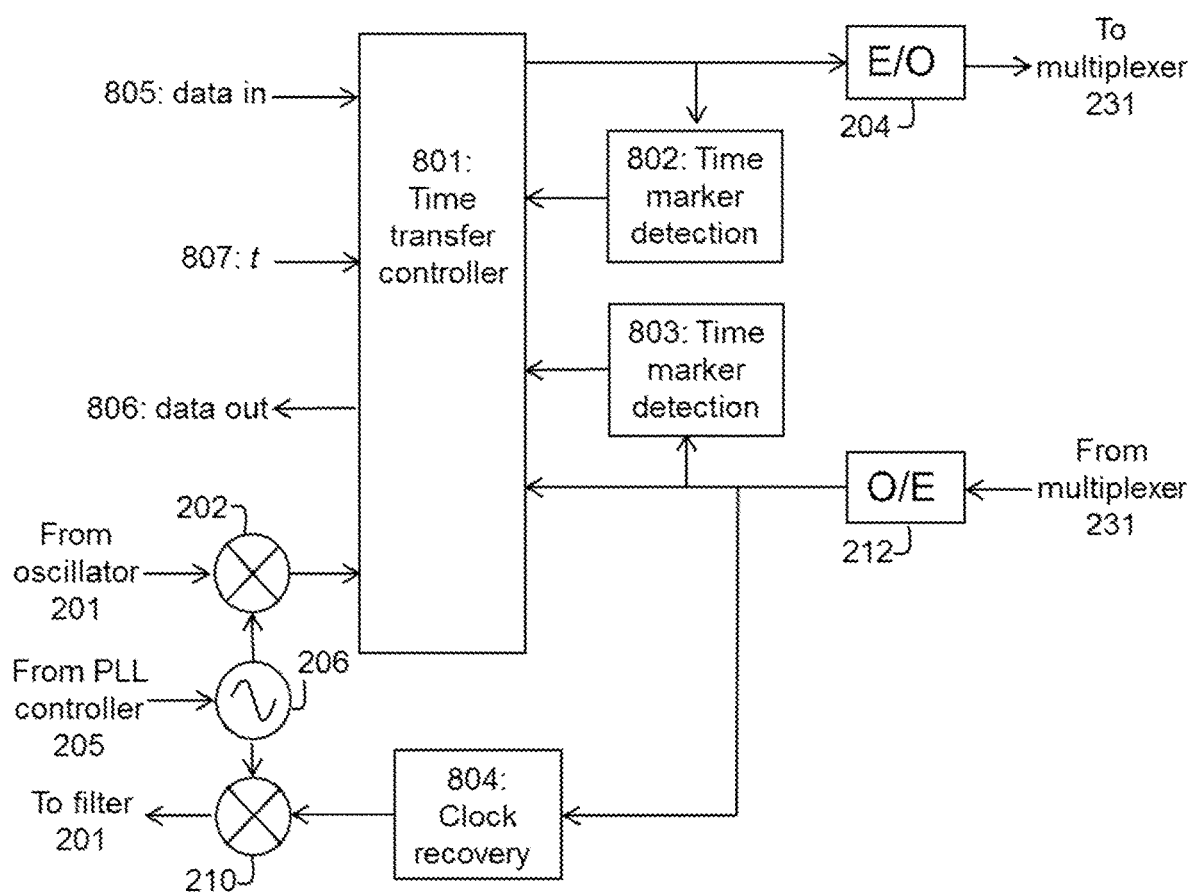
FIG. 8 illustrates a transmitter according to an embodiment of the invention.

The embodiments of the invention presented this far have concentrated exclusively on frequency and/or data transfer. However, the concept of using a pair of RF mixers in forward and backward paths of the transmitter may be utilized just as well in time transfer systems, that is, systems for transferring of a time reference as well as a frequency reference. Time transfer in said time transfer system may be based on embedding time markers (that is, coding timing information) into the transferred signal. Said time markers may be, for example, specific bit patterns or amplitude, frequency, phase, or pulse width changes in the signal. Time transfer may be achieved with any of the previously described embodiments of the invention with a few modifications to the transmitter and the receiver. Additional elements needed for realizing time transfer for a transmitter according to FIG. 2 are illustrated in FIG. 8 and for a receiver according to FIG. 2 in FIG. 9. Said additional elements provide means for coding as well as decoding timing information for the transmitter and the receiver. Apart from the new elements, the transmitter/receiver architecture may be the same as shown in FIG. 2 or in any of FIGS. 3 to 6.

Referring to FIG. 8, a time transfer controller 801 may be provided for applying time markers as described in the previous paragraph to the signal to be transmitted (the output signal of the RF mixer 202) based on a time reference 807. The timing information contained in the time markers may be used by the receiver for adjusting its internal clock. The time transfer controller 801 may also take as its input the received electrical signal (that is, the output signal of the O/E converter 212). Two time marker detection units 802, 803 may be arranged to detect the time markers applied to the input signal of the E/O converter 204 and the output signal of the O/E converter 212 and feed signals carrying said time-marker information back to the time transfer controller 801. To recover the transferred frequency, a clock recovery circuit 804 may be provided in the backward path before the RF mixer 210. In some embodiments, the time transfer controller 801 may also have a data input 805 and a data output 806 for inputting data to be transferred along with the time reference and for outputting data transferred from the receiver to the transmitter. In some embodiments, one or both of the time marker detection units 802, 803 may be comprised in the time transfer controller 801.

Figure 9:
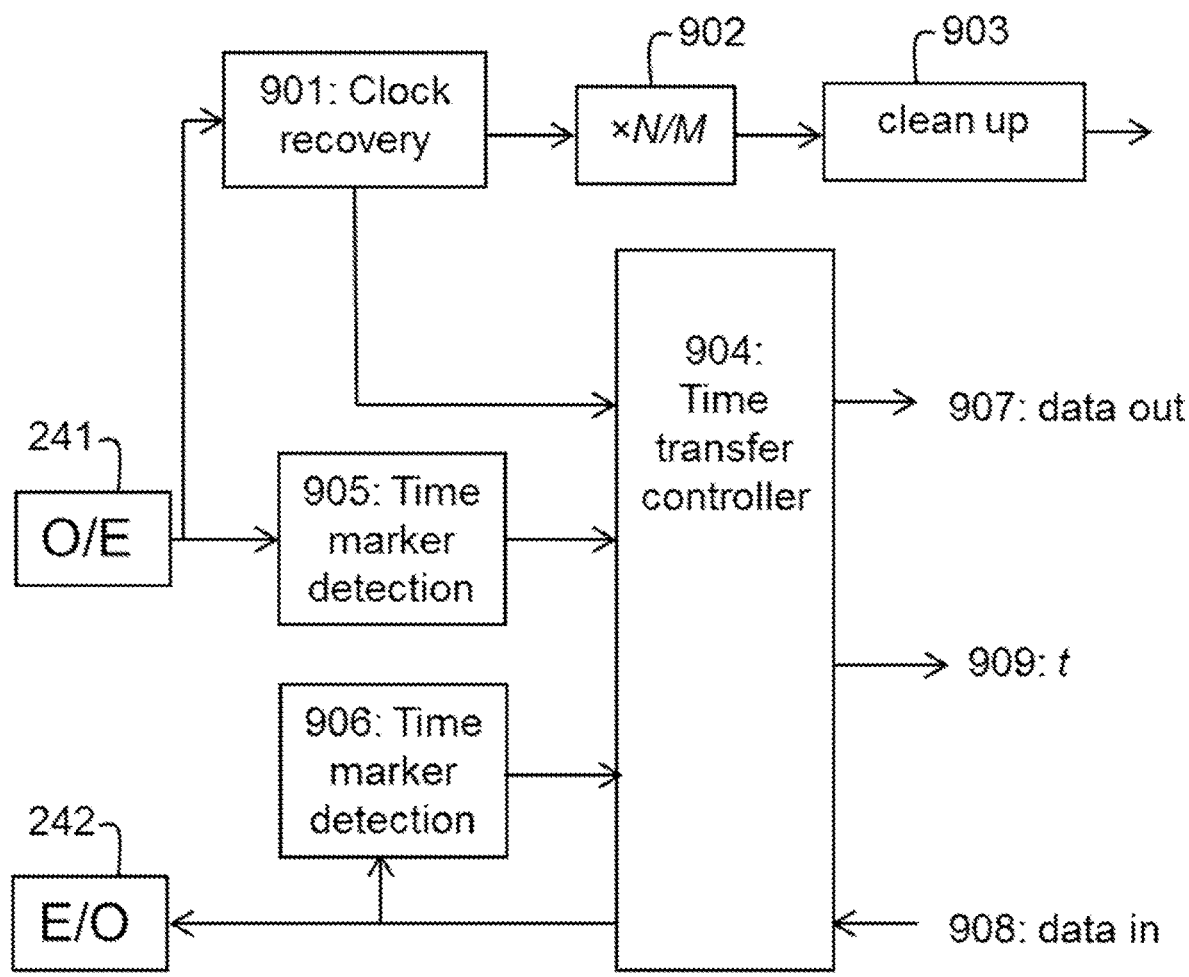
FIG. 9 illustrates a receiver according to an embodiment of the invention.

FIG. 9 shows how similar elements as shown in FIG. 8 may also be used for realizing the time transfer in the receiver. After the transmitted signal has been received by the receiver and converted by the O/E converter 241 to an electrical signal, the output signal of the O/E converter 241 may be fed to a clock recovery circuit 901 to recover the transferred frequency which may be consequently multiplied, divided, filtered and/or cleaned up by elements 902, 903. The clock recovery circuit 901 may also provide an output to the time transfer controller 904 which may embed time markers to the electrical signal to be transmitted back to the transmitter and time stamp the time markers using an internal clock of the time transfer controller 904. The time transfer controller 904 may be provided with the time marker information of the transmitted electrical signal by the time marker detection unit 905 which takes as its input the output signal of the O/E converter 241. Another time marker recovery unit 906 may be provided to recover the time markers from the signal fed to the E/O converter 242 (that is, the electrical signal to be transmitted back to the transmitter). The internal clock may be phase-locked to the transmitted frequency reference signal (the output signal of the clock recovery circuit 901). In some embodiments, the time transfer controller 904 may also have a data input 908 and a data output 907 for inputting data to be transferred along with the time reference and for outputting data transferred to the receiver from the transmitter. Similar to the transmitter of FIG. 8, one or both of the time marker detection units 905, 906 may be comprised in the time transfer controller 904 in some embodiments.

The time transfer controller 801 of the transmitter in FIG. 8 and the time transfer controller 904 of the receiver in FIG. 9 may transmit the timing information between them using the data stream or possibly another channel. Based on the timing information, the time difference between the clock of the transmitter and the clock of the receiver may be computed, after which the clock of the receiver may be adjusted accordingly.

Figure 10:
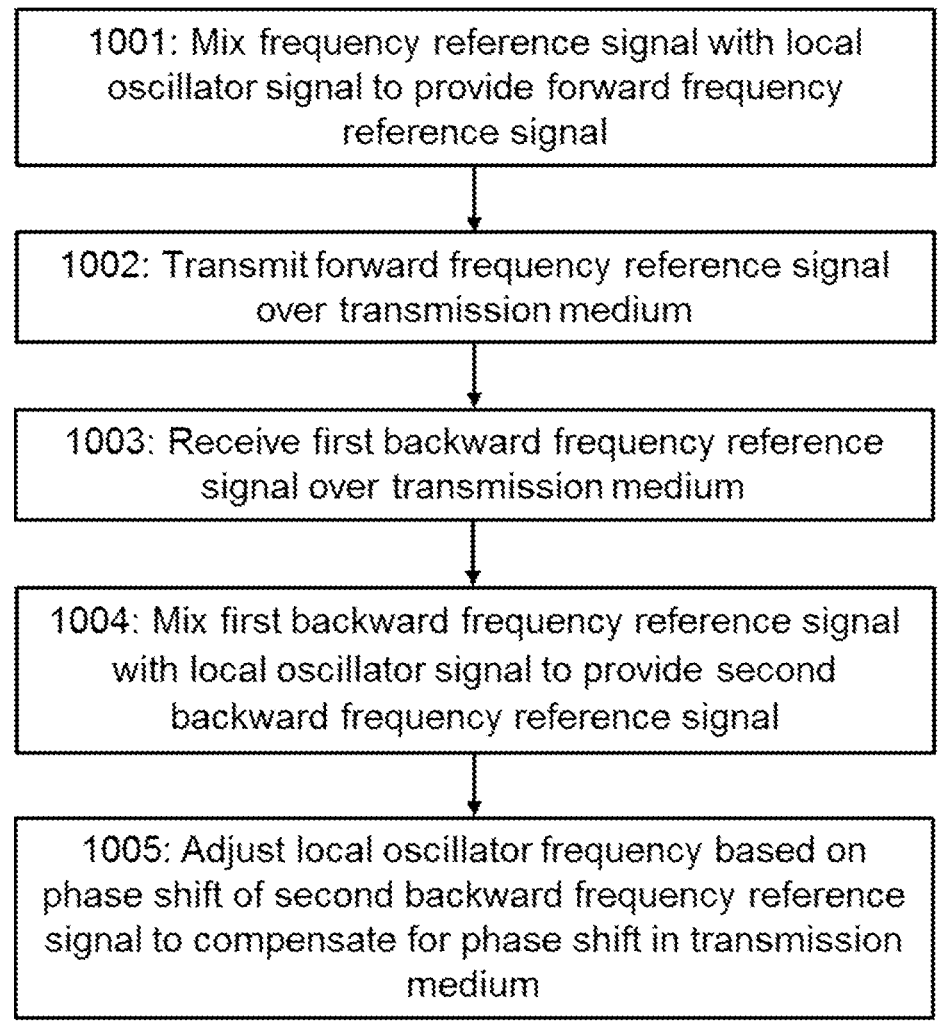
FIG. 10 illustrates a flow diagram of a method according to an embodiment of the invention.

FIG. 10 shows a method according to an embodiment of the invention for realizing frequency transfer in a transmitter. The illustrated method may be, for example, performed by any of the transmitters according to embodiments of the invention illustrated in FIGS. 2 to 9.

Referring to FIG. 10, the transmitter mixes, in block 1001, a frequency reference signal having a reference frequency with a local oscillator signal having a local oscillator frequency. One resulting mixing product represents a forward frequency reference signal. Then, the transmitter transmits, in block 1002, the forward frequency reference signal over the transmission medium to the receiving end. The transmitter receives, in block 1003, a first backward frequency reference signal over the transmission medium from the receiving end. The first backward frequency reference signal may be formed by a portion of the forward frequency reference signal being reflected back from the receiving end or by replicating the forward frequency reference signal in the receiving end and transmitting the replicated forward frequency reference signal back from the receiving end. The transmitter mixes, in block 1004, the first backward frequency reference signal with the local oscillator signal. One resulting second mixing product represents a second backward frequency reference signal (having a second backward reference frequency). Finally, the transmitter adjusts, in block 1005, the local oscillator frequency based on a phase shift of the second backward frequency reference signal so as to compensate for a phase shift of the forward frequency reference signal that occurs in the transmission medium.

Even though the invention has been described above with reference to examples according to the accompanying drawings, it is clear that the invention is not restricted thereto but it can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways.

The invention claimed is:

1. An apparatus for distribution of frequency reference to a receiving end over a transmission medium, the apparatus comprising
   a first mixer, preferably of an up-conversion type, adapted to mix a frequency reference signal having a reference frequency with a local oscillator signal having a local oscillator frequency, wherein a mixing product of the first mixer represents a forward frequency reference signal;
   a communication section adapted to transmit the forward frequency reference signal over the transmission medium to the receiving end and adapted to receive a first backward frequency reference signal over the transmission medium from the receiving end, the first backward frequency reference signal being formed by a portion of the forward frequency reference signal reflected back from the receiving end or by replicating the forward frequency reference signal in the receiving end and transmitting the replicated forward frequency reference signal back from the receiving end;
   a second mixer being adapted to mix the first backward frequency reference signal with the local oscillator signal having the local oscillator frequency, wherein a mixing product of the second mixer represents a second backward frequency reference signal; and
   a phase comparator and control circuit adapted to adjust the local oscillator frequency based on a phase shift of the second backward frequency reference signal so as to compensate for a phase shift of the forward frequency reference signal that occurs in the transmission medium.

2. An apparatus according to claim 1, wherein the first mixer and the second mixer are mixers of the same type.

3. An apparatus according to claim 1, wherein the phase comparator and control circuit comprises a phase-locked loop controller controlling the local oscillator frequency of a local oscillator driving a phase-locked loop.

4. An apparatus according to claim 1, wherein the phase comparator and control circuit comprises a frequency converter adapted to convert one of the reference frequency and a second backward reference frequency of the second backward frequency reference signal to equalize the frequencies for a phase comparison, wherein the frequency converter preferably comprises a frequency multiplier and/or a frequency divider.

5. An apparatus according to claim 1, further comprising:
   means for coding timing information into the forward frequency reference signal to provide a time reference; and
   means for decoding timing information from the first backward frequency reference signal.

6. An apparatus according to claim 1, further comprising one or more of the following:
   a first bandpass filter adapted to filter an output signal of the first mixer to pass only said mixing product of the first mixer for transmission as the forward frequency reference;
   a second bandpass filter adapted to filter the first backward frequency reference signal to pass only said mixing product of the first mixer upon reception; and
   a third bandpass filter adapted to filter an output signal of the second mixer to pass to the phase comparator and control circuit only said mixing product of the second mixer as the second backward frequency reference signal.

7. An apparatus according to claim 6, wherein said mixing product of the first mixer and said mixing product of the second mixer are mixing products of the same type, the type preferably corresponding to a sum or a positive difference between frequencies of signals to be mixed.

8. An apparatus according to claim 1, wherein the reference frequency is substantially equal to or a multiple of the local oscillator frequency or the local oscillator frequency is substantially a multiple of the reference frequency.

9. An apparatus according to claim 1, further comprising:
a re-timing unit adapted to receive a first data stream, re-time a first clock frequency of the first data stream with a forward frequency reference of the forward frequency reference signal and transmit a re-timed first data stream in the forward frequency reference signal;
a data output for outputting a first backward frequency reference data signal, wherein the first backward frequency reference data signal is the first backward frequency reference signal comprising a second data stream; and
a clock recovery circuit adapted to recover the first backward frequency reference signal from the first backward frequency reference data signal.

10. An apparatus according to claim 1, wherein the reference frequency and the local oscillator frequency are radio frequencies.

11. An apparatus according to claim 1, wherein the transmission medium comprises an optical transmission medium, the apparatus further comprising:
a first electrical-to-optical converter adapted to convert the forward frequency reference signal to a forward optical frequency signal before transmission; and
a first optical-to-electrical converter adapted to convert a backward optical frequency signal to the first backward frequency reference signal upon reception.

12. An apparatus according to claim 1, wherein the transmission medium comprises guided radio transmission media and/or free-space radio transmission medium.

13. A system, comprising:
an apparatus according to claim 1;
a receiver, in the receiving end, comprising a partial reflector for reflecting a portion of the forward frequency reference signal back to the apparatus; and
the transmission medium connecting the apparatus and the receiver.

14. A system according to claim 13, wherein the transmission medium comprises an optical transmission medium, the apparatus further comprising:
a first electrical-to-optical converter adapted to convert the forward frequency reference signal to a forward optical frequency signal before transmission; and
a first optical-to-electrical converter adapted to convert a backward optical frequency signal to the first backward frequency reference signal upon reception,
wherein the receiver further comprises:
a second optical-to-electrical converter adapted to convert the forward optical frequency signal to the forward frequency reference signal upon reception; and
a second electrical-to-optical converter adapted to convert the first backward frequency reference signal to the backward optical frequency signal before transmission, the system further comprising:
a transmitter multiplexer for connecting the forward optical frequency signal to the optical fiber and the backward optical frequency from the optical fiber to the first optical-to-electrical converter; and
a receiver multiplexer for connecting the backward optical frequency signal to the optical fiber and the forward optical frequency signal from the optical fiber to the second optical-to-electrical converter.

15. A method for distribution of a frequency reference to a receiving end over a transmission medium, the method comprising:
mixing a frequency reference signal having a reference frequency with a local oscillator signal having a local oscillator frequency to provide a first mixing product, wherein said first mixing product represents a forward frequency reference signal;
transmitting the forward frequency reference signal over the transmission medium to the receiving end;
receiving a first backward frequency reference signal over the transmission medium from the receiving end, the first backward frequency reference signal being formed by a portion of the forward frequency reference signal reflected back from the receiving end or by replicating the forward frequency reference signal in the receiving end and transmitting the replicated forward frequency reference signal back from the receiving end;
mixing the first backward frequency reference signal with the local oscillator signal to provide a second mixing product, wherein said second mixing product represents a second backward frequency reference signal; and
adjusting the local oscillator frequency based on a phase shift of a second backward frequency reference signal so as to compensate for a phase shift of the forward frequency reference signal that occurs in the transmission medium.

16. A method according to claim 15, further comprising equalizing the reference frequency of the frequency reference signal and a second backward reference frequency of the second backward frequency reference signal before the adjusting.

17. A method according to claim 15, the method further comprising:
coding timing information into the forward frequency reference signal to provide a time reference; and
decoding timing information from the first backward frequency reference signal.

18. A method according to claim 15, wherein said first mixing product and said second mixing product are mixing products of the same type, the type of the mixing product preferably corresponding to a sum or a positive difference between frequencies of signals to be mixed.

19. A method according to claim 15, further comprising:
receiving a first data stream;
re-timing a first clock frequency of the first data stream with a forward frequency reference of the forward frequency reference signal;
transmitting a re-timed first data stream in the forward frequency reference signal;
outputting a first backward frequency reference data signal received from the receiving end, wherein the first backward frequency reference data signal is the first backward frequency reference signal comprising a second data stream; and
recovering the first backward frequency reference signal from the first backward frequency reference data signal.

20. A method according to claim 15, wherein the reference frequency is substantially equal to or a multiple of the local oscillator frequency or the local oscillator frequency is substantially a multiple of the reference frequency.

* * * * *